(12) United States Patent
Chen

(10) Patent No.: US 8,313,320 B2
(45) Date of Patent: Nov. 20, 2012

(54) MICRO-LENS ARRAY FABRICATION APPARATUS

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 335 days.

(21) Appl. No.: 12/859,282

(22) Filed: Aug. 19, 2010

(65) Prior Publication Data

US 2011/0268830 A1   Nov. 3, 2011

(30) Foreign Application Priority Data

Apr. 28, 2010   (CN) .......................... 2010 1 0158503

(51) Int. Cl.
*B29C 51/10* (2006.01)

(52) U.S. Cl. ..................... 425/115; 425/387.1; 425/388; 425/394; 425/395; 425/405.1; 425/471; 264/1.6; 264/2.7; 264/101; 264/172.19; 264/175; 264/511; 264/553; 264/555; 264/571

(58) Field of Classification Search .................. 425/115, 425/387.1, 388, 394, 395, 405.1, 471; 264/1.6, 264/2.7, 101, 172.19, 175, 511, 553, 555, 264/571

See application file for complete search history.

(56) References Cited

U.S. PATENT DOCUMENTS

| | | | | |
|---|---|---|---|---|
| 2,915,787 A * | 12/1959 | Ewing et al. | ................... | 264/284 |
| 3,142,599 A * | 7/1964 | Chavannes | .................... | 156/210 |
| 3,449,158 A * | 6/1969 | Rowland | ........................ | 264/1.6 |
| 4,181,548 A * | 1/1980 | Weingarten | .................... | 156/145 |
| 5,975,706 A * | 11/1999 | Nakayama | .................... | 359/530 |
| 7,294,238 B2 * | 11/2007 | Bakken et al. | ................ | 162/362 |
| 2007/0273058 A1 * | 11/2007 | Loh et al. | ....................... | 264/2.7 |

* cited by examiner

*Primary Examiner* — Joseph Del Sole
*Assistant Examiner* — Timothy Kennedy
(74) *Attorney, Agent, or Firm* — Altis Law Group, Inc.

(57) ABSTRACT

A micro-lens array fabrication apparatus includes a first roller, a second roller, a molding member, and a cooling member. The first roller and the second roller revolve cooperatively to position portions of a substrate on the molding member while maintaining a tension on the substrate. The molding member includes a shaft and two caps connected to opposites ends of the shaft. The shaft defines a through hole and rows of molding holes in a lateral surface thereof, and forms heaters in the though hole. The heaters heat up the substrate till molten, and the air is driven to blow the molten substrate into the molding holes and form a row of micro-lens structures on the currently positioned portion of the substrate.

5 Claims, 3 Drawing Sheets

MICRO-LENS ARRAY FABRICATION APPARATUS

BACKGROUND

1. Technical Field

The present disclosure relates to an apparatus for fabricating a micro-lens array on a substrate.

2. Description of the Related Art

In the optical industry, micro-lens arrays are utilized to increase viewing angle and contrast ratio by adjusting light transmission according to a light incident direction onto the micro-lens arrays. One conventional approach for fabricating micro-lens arrays usually includes the following steps:

1. Depositing ultraviolet curable lens material on a substrate.
2. Applying a press-molding mold on the molding material to form a plurality of micro-lens structures.
3. Exposing the mold to UV light to solidify the micro-lens structures.

However, one problem with this method is that it often results in excess molding material being discarded especially at the edges of the molded optical structure.

BRIEF DESCRIPTION OF THE DRAWINGS

The components of the drawings are not necessarily drawn to scale, the emphasis instead being placed upon clearly illustrating the principles of a micro-lens array fabrication apparatus. Moreover, in the drawings, like reference numerals designate corresponding parts throughout several views.

DETAILED DESCRIPTION

Figure 1:
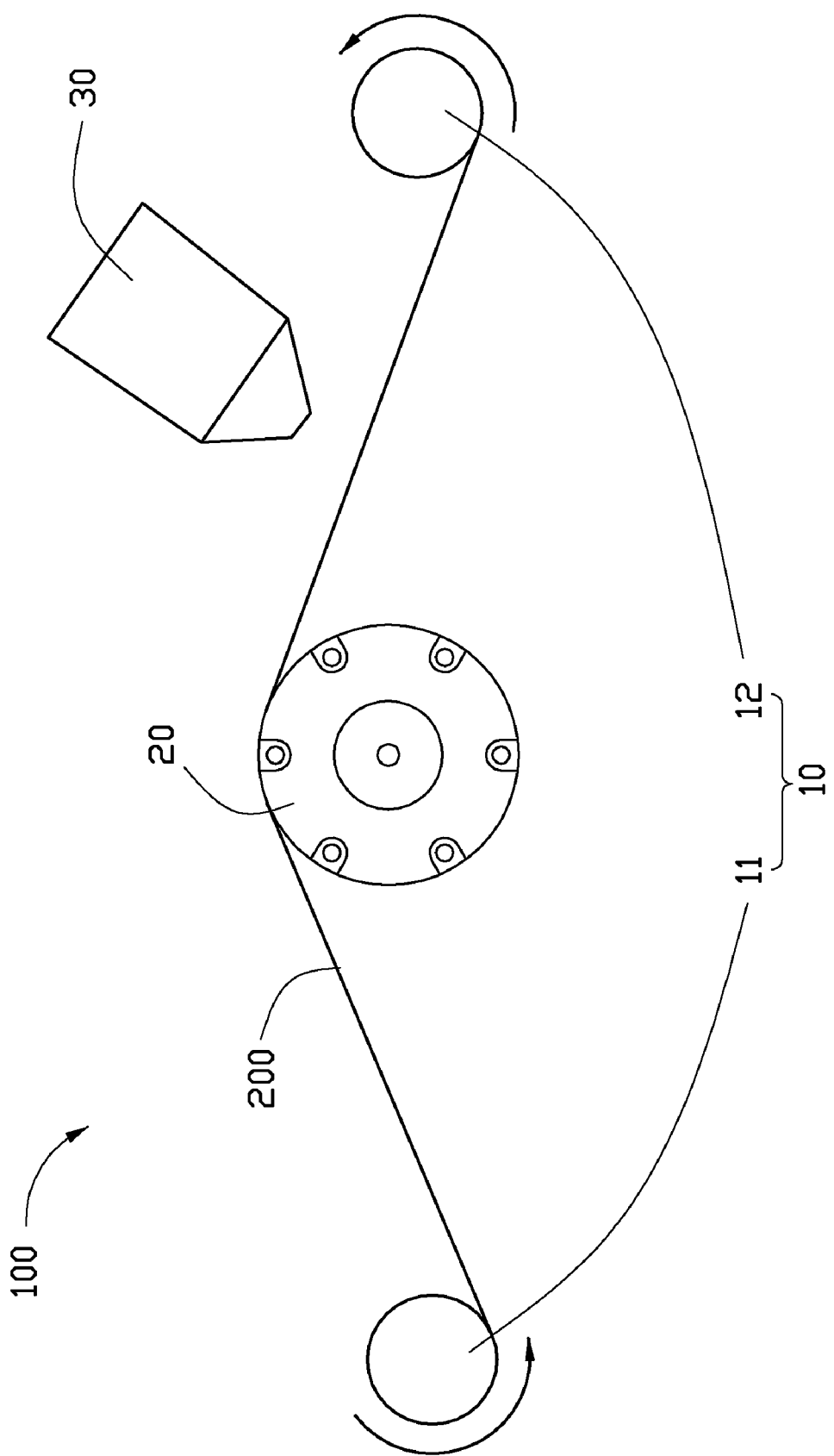
FIG. 1 is a schematic view of a micro-lens array fabrication apparatus according to an exemplary embodiment.

Referring to FIG. 1, a micro-lens array fabrication apparatus 100 includes a substrate transport member 10, a molding member 20, and a cooling member 30. The substrate transport member 10 includes a first roller 11 and a second roller 12 revolving cooperatively to position portions of a substrate 200 on the molding member 20, rotation of the rollers is synchronized to maintain a proper tension on the substrate 200. The molding member 20 is configured to melt a portion of the substrate 200 currently positioned over and against the molding member 20 and form micro-lens structures in the substrate 200. The cooling member 30 is configured to cool and solidify the molded micro-lens structures.

Figure 2:
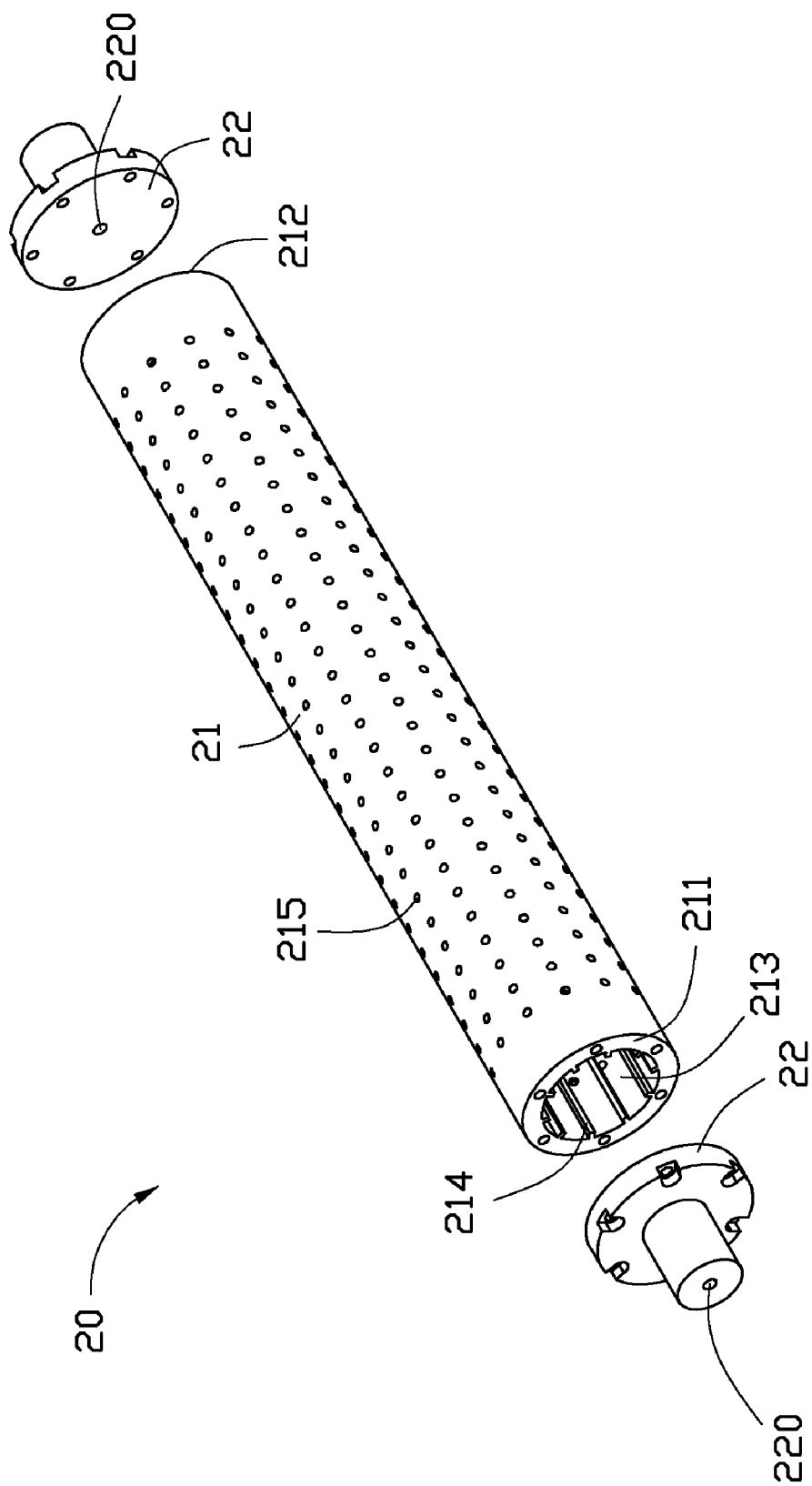
FIG. 2 is an exploded, schematic view of a molding member of the fabrication apparatus of FIG. 1.
Figure 3:
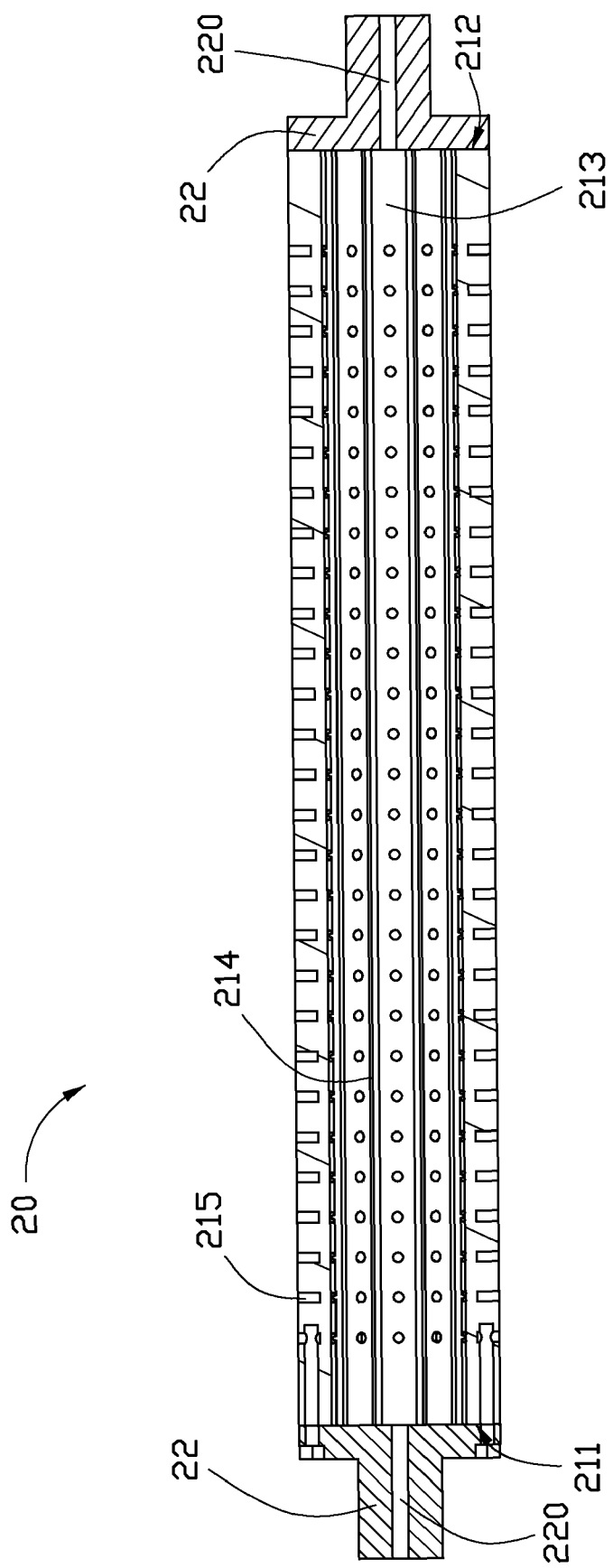
FIG. 3 is a cross section view of the molding member of the fabrication apparatus of FIG. 2.

Referring to FIGS. 2 and 3, the molding member 20 includes a shaft 21 and two caps 22 connected to opposite ends of the shaft 21. The shaft 21 is made of heat conductive material, and includes a first end surface 211 and a second end surface 212 at opposite ends thereof. The shaft 21 defines a through hole 213 spanning through both the first end surface 211 and the second end surface 212, and forms a plurality of bar heaters 214 on an inner surface of the through hole 213. The bar heater 214 extends along the central axis of the shaft 21, and is electrically connected to a heating circuit (not shown). The shaft 21 further defines a plurality of rows of micro-meter sized molding holes 215. Each row of molding holes 215 is defined medially between two bar heaters 214.

The two caps 22 each define an air outlet 220 communicating with the through hole 213 and the molding holes 214. The two caps 22 are both connected to a suction device, e.g. a vacuum machine (not shown). When the vacuum machine works, air can be drawn through the molding holes 214, the through hole 213, and the air outlet 220 into the vacuum machine.

The cooling member 30 is disposed after the molding member 20 to cool and solidify the molded micro-lens structures of the substrate 200. In the embodiment, the cooling member 30 can be a blower.

When in use, the first roller 11 and the second roller 12 revolve cooperatively to position portions of the substrate 200 on the molding member 20 while maintaining a tension on the substrate 200. The bar heaters 215 heat up the substrate 200 till molten, and the air is driven to blow the molten substrate 200 into the molding holes 215 and form a row of micro lenses structures on the currently positioned portion of the substrate 200. The first roller 11 and the second roller 12 then rotate to move a next portion of the substrate 200 into position for another row of micro-lens structures to be formed until a desired array or arrays is obtained.

Although the present disclosure has been specifically described on the basis of certain embodiments thereof, the disclosure is not to be construed as being limited to the described embodiments. Various changes or modifications may be made to the embodiments without departing from the scope and spirit of the disclosure.

What is claimed is:

1. A micro-lens array fabrication apparatus comprising:
   a first roller;
   a second roller;
   a molding member comprising:
      a shaft defining a through hole, comprising a plurality of heaters in the through hole and defining a plurality of rows of molding holes in an lateral surface thereof; and
      two caps connected to opposite ends of the shaft, each of the two caps defining an air outlet communicating with the molding holes and a suction device; and
   a cooling member;
   wherein the first roller and the second roller revolve cooperatively to position portions of a substrate on the molding member while maintaining a tension on the substrate, the heaters heat up the substrate till molten, and the air is driven to blow the molten substrate into the molding holes and form a row of micro-lens structures on the currently positioned portion of the substrate.

2. The fabrication apparatus as described in claim 1, wherein the shaft comprises a first end surface and a second end surface, the two caps are connected to the first end surface and the second end surface, respectively, and the through hole of the shaft communicates with the molding holes and the two air outlets.

3. The fabrication apparatus as described in claim 2, wherein the heaters are arranged on an inner surface of the through hole and extend parallel to a central axis of the shaft.

4. The fabrication apparatus as described in claim 3, wherein each row of molding holes is defined medially between two of the heaters.

5. The fabrication apparatus as described in claim 1, wherein the cooling member is a blower disposed after the molding member to cool and solidify the molded micro-lens structures.

* * * * *